May 30, 1961  J. P. PERINE  2,986,276
MAIL CULLING EQUIPMENT
Filed Dec. 30, 1957  8 Sheets-Sheet 2
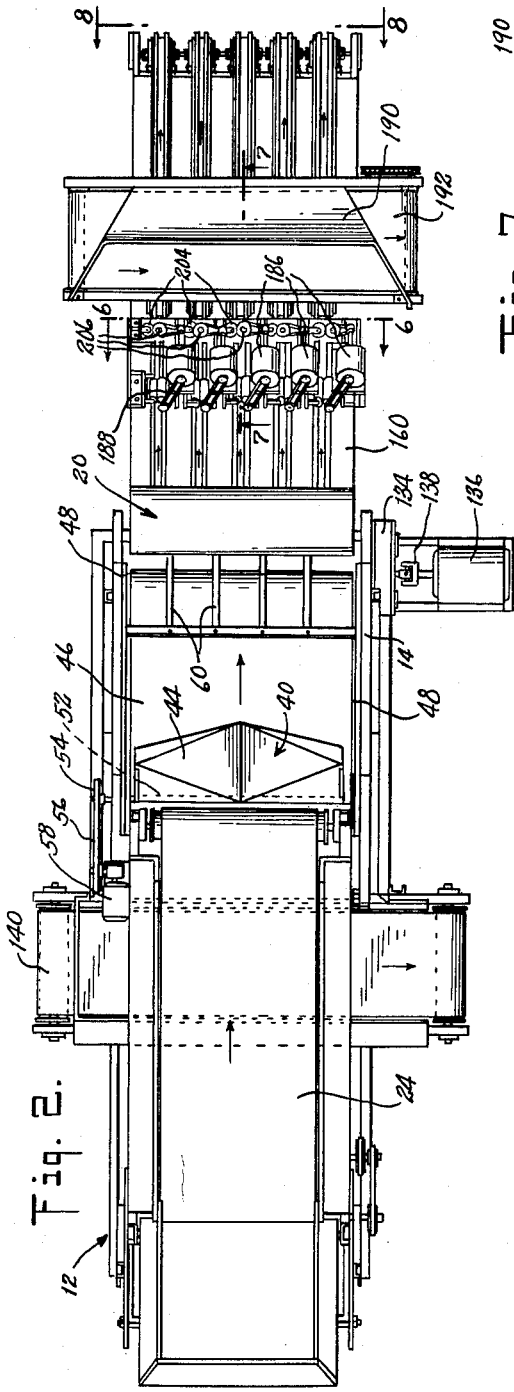
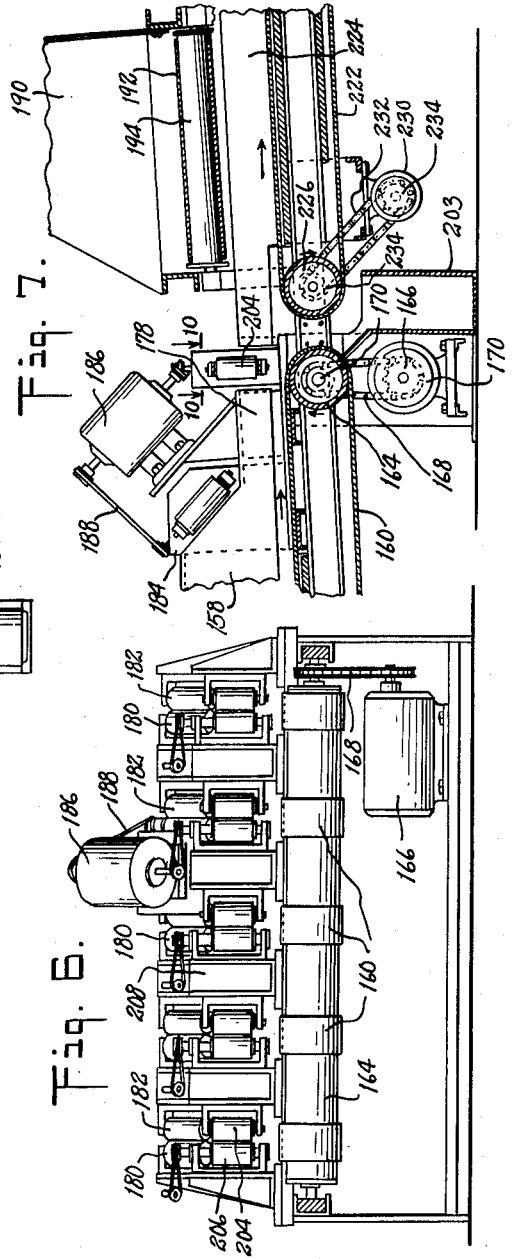
INVENTOR.
JACK P. PERINE
BY Darby & Darby
ATTORNEYS INVENTOR.
JACK P. PERINE
BY Darby & Darby
ATTORNEYS May 30, 1961 J. P. PERINE 2,986,276
MAIL CULLING EQUIPMENT
Filed Dec. 30, 1957 8 Sheets-Sheet 5

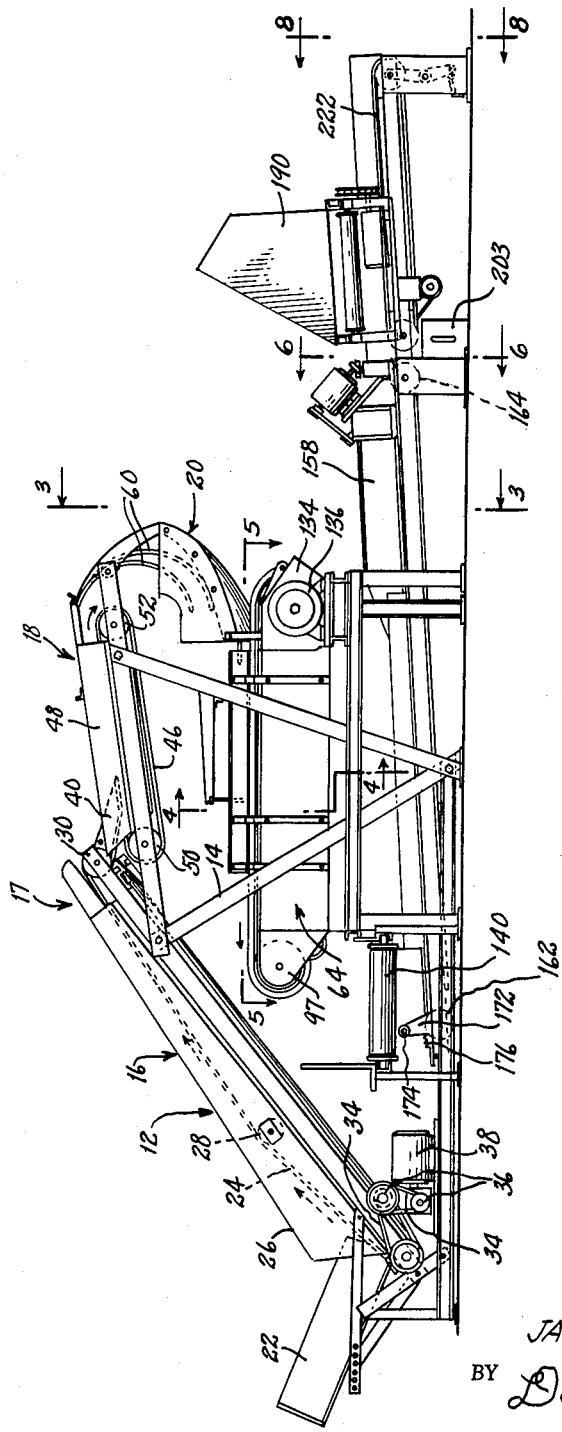

INVENTOR.
JACK P. PERINE
BY Darby & Darby
ATTORNEYS

May 30, 1961 J. P. PERINE 2,986,276
MAIL CULLING EQUIPMENT
Filed Dec. 30, 1957 8 Sheets-Sheet 6
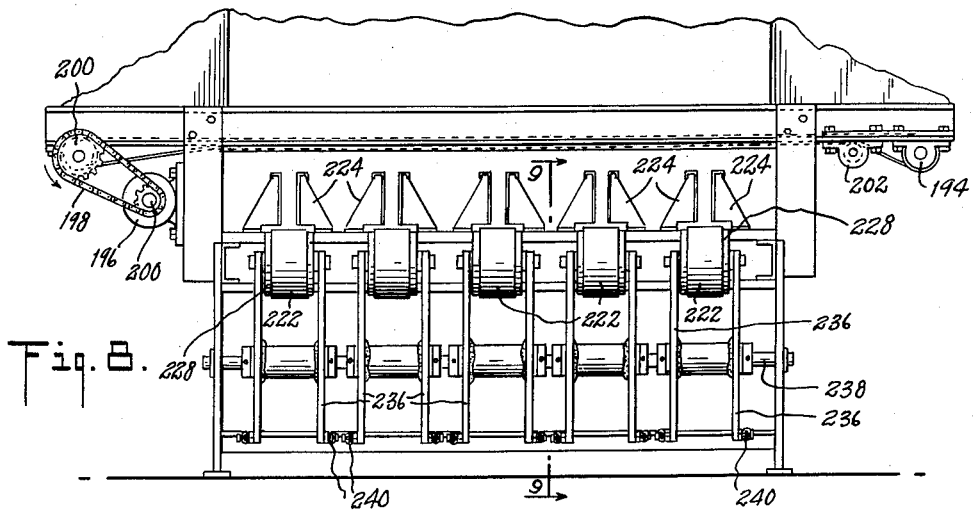
Fig. 8.
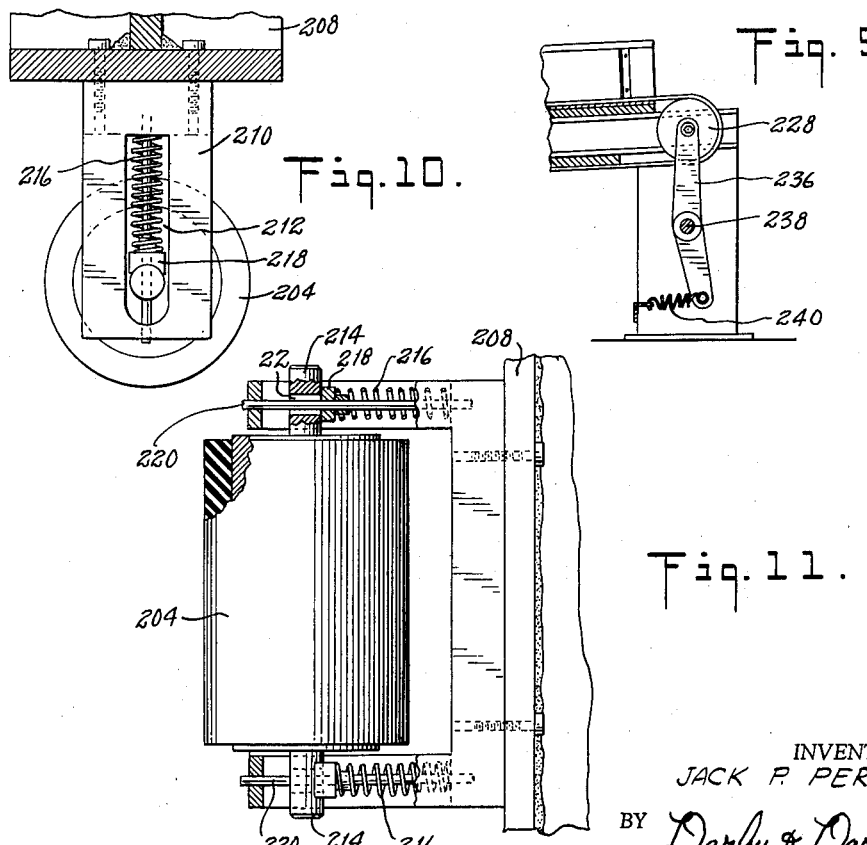
Fig. 9.
Fig. 10.
Fig. 11.
INVENTOR.
JACK P. PERINE
BY Darby & Darby
ATTORNEYS May 30, 1961 J. P. PERINE 2,986,276
MAIL CULLING EQUIPMENT
Filed Dec. 30, 1957 8 Sheets-Sheet 7
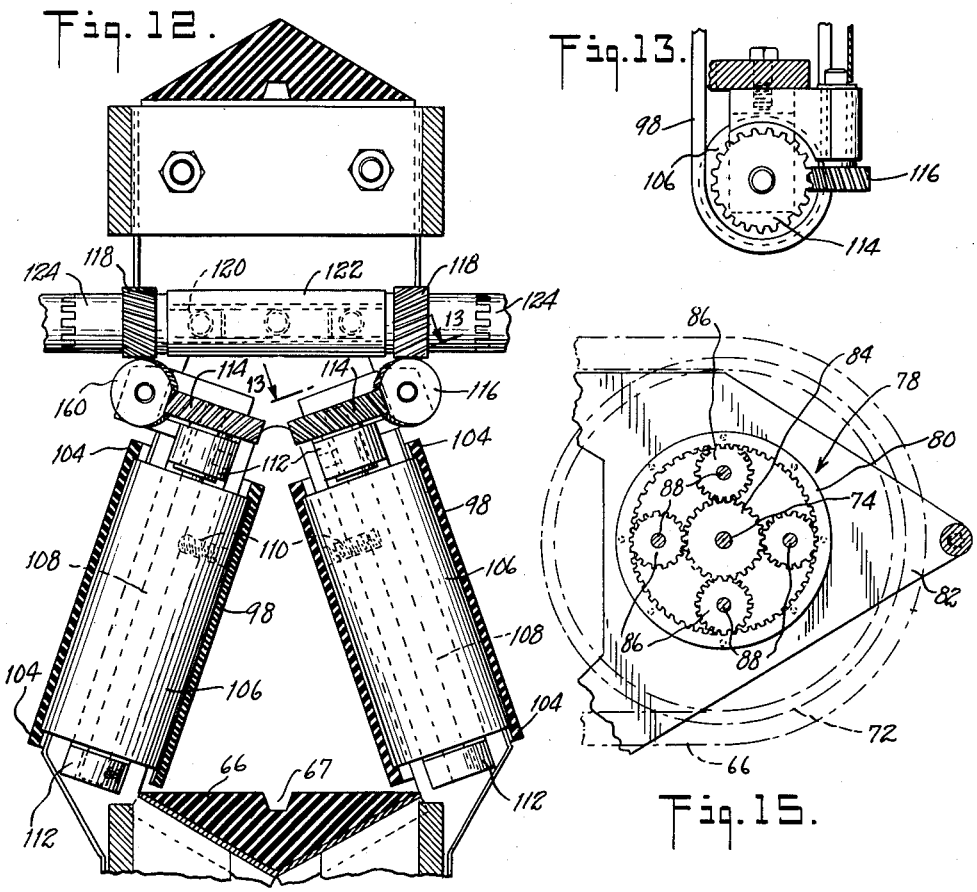
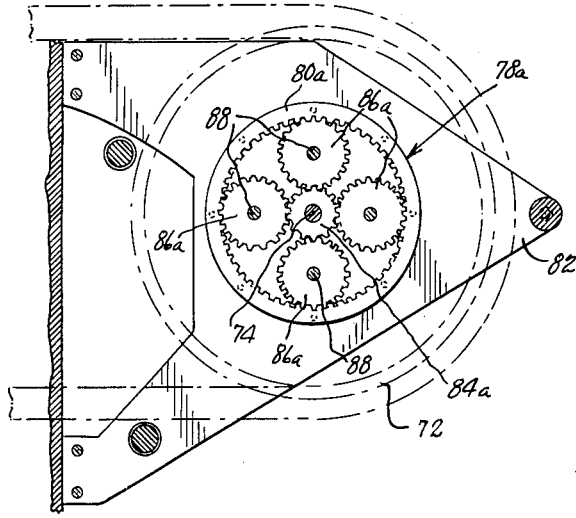
INVENTOR.
JACK P. PERINE
BY Darby & Darby
ATTORNEYS

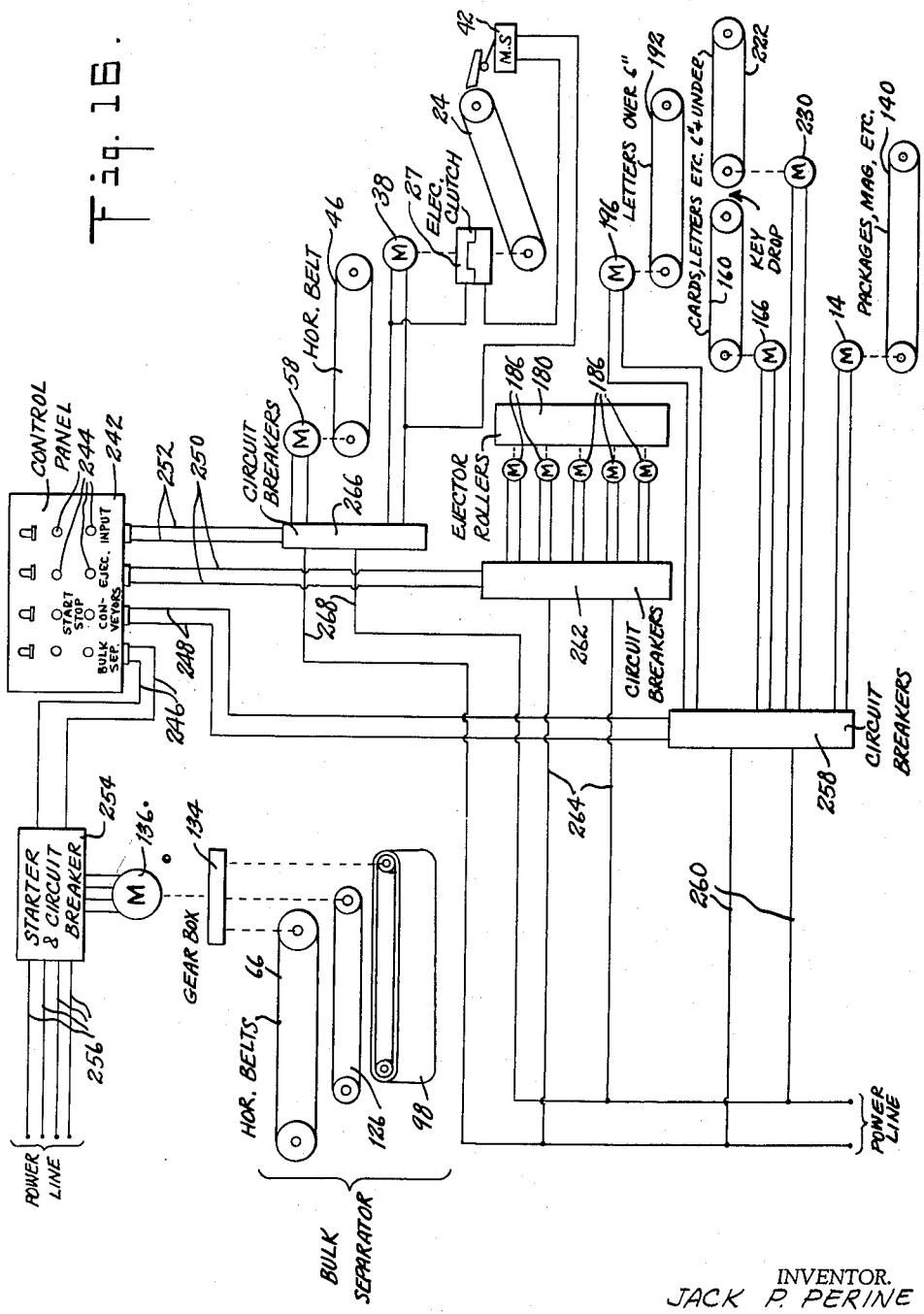

Header omitted 2,986,276

MAIL CULLING EQUIPMENT

Jack P. Perine, Montgomery County, Md., assignor to Emerson Radio & Phonograph Corporation, Jersey City, N.J., a corporation of New York Filed Dec. 30, 1957, Ser. No. 705,872

1 Claim. (Cl. 209—102)

The present invention relates to apparatus for sorting articles of various sizes and shapes to obtain articles falling within a predetermined range of dimensions and more particularly to apparatus for sorting letter mail from bulk mail which includes packages, large flat envelopes, and the like.

The expeditious handling and processing of letter mail has become vital to the efficient conduct of business and to communication. The volume of mail pieces has become so large as to encumber and literally swamp postal facilities at the larger metropolitan post offices handling millions of pieces of mail delivery. The problems of conveying, cancelling and sorting this vast volume of varied shapes and sizes of mail pieces have heretofore not been efficiently solved, resulting in delays in mail delivery and uneconomical utilization of space, equipment and manpower.

In providing mechanical apparatus for the handling of mail it is desirable that the complete mail processing operation be conducted by automatic machinery insofar as possible. In order to accomplish this, it is necessary that mail handling equipment be provided which will accept bulk mail as it is normally received at the post office and which includes packages, rolled papers, pamphlets, tagged 35 mm. film sacks, post cards, letters and other objects of various sizes and shapes; and that this conglomeration be sorted so that the letters, which require substantially uniform handling, may be separated from the packages, large flat envelopes and the like, which may require different handling procedures.

The present invention provides improved apparatus which accepts bulk mail just as it would be unloaded from a mail sack, for example, and sorts this mail to obtain the so called "clean letter mail" from the remainder of the bulk mail. Bulk mail contains principally packages and envelopes; large envelopes are called "flats" or "odd mail" while small letter-size envelopes and the like are designated "clean letter mail." The letter mail will normally constitute the major portion of the mail volume from a standpoint of number of pieces of mail. In addition, the large flat envelopes which are not considered to be letter mail are separated from thicker packages such as parcels, newspapers and the like.

For the purpose of illustration clean letter mail will be designated as mail having a length of less than twelve inches, a width of less than six inches and a thickness of less than one-quarter of an inch. It should be understood however, that these dimensions are more or less arbitrary and that the apparatus could readily be designed to sort mail or other objects in accordance with different ranges of dimensions.

Numerous problems arise in the mechanical sorting of such diverse articles as are contained in bulk mail in order to obtain only those articles of certain prescribed dimensions. The difficulties are increased by the fact that many of the articles such as airmail letters, post cards and the like are susceptible to damage by tearing. Others of the articles are somewhat fragile such as small packages and are susceptible to damage by shock or by crushing.

Improved apparatus according to the present invention solves the sorting problem by a number of integrated steps. The first step in the sorting operation is to convert the mail into a stream flowing at a substantially uniform rate. The apparatus is provided with a hopper or other input apparatus with a substantial storage capacity so that large sacks or loads of mail can be dumped into the apparatus. It is then necessary to pick up this mail and feed it in a substantially uniform stream through the sorting apparatus. This is accomplished by a sharply inclined belt which picks up the mail from the hopper at a relatively slow rate of speed and prevents large batches of mail being fed into the device at one time.

The rate of flow of mail is further smoothed by a metering device which causes the inclined belt to be stopped and started in such a way as to feed a continuous stream of mail to a second belt. The second belt is operated at a higher speed and thus uniformly thins out the stream of mail.

Apparatus for performing the previously described operations is not in itself a part of the present invention but is rather covered in a separate application Serial No. 706,118 filed in the names of Franklin J. Thurston, Jack P. Perine and John R. Thorsen, now abandoned.

The next major step is to orient the mail in a particular fashion so that each piece may be sorted with respect to its minimum dimensions or thickness. According to the present invention this is accomplished by a novel corrugated trough arrangement which causes mail pieces of a flat shape to be oriented with the planes of the mail pieces approximately vertically aligned.

The mail from the orienting trough is dropped edgewise on and between a series of moving belts. This series of belts carries away all large packages and also rotates smaller mail pieces so that if they have any dimension which is small enough to allow them to fall between the belts, they will do so.

Further pairs of belts are provided under the first belts which sort the remaining mail to a finer degree eliminating all mail having a minimum dimension or thickness greater than the prescribed value, in one example, one-quarter inch.

Certain features of the belt system described above are improvements over an arrangement shown and claimed in the previously mentioned application No. 706,118.

Apparatus for performing the following steps to be described immediately below is not claimed as the invention.

The mail is then dumped on a still further conveyor belt moving in the opposite direction and is thereby tumbled so that it tends to rest on its longest dimension. The planes of the flat mail pieces are retained in parallel relationship by guides located above this latter belt.

The next step of the operation is to sort the mail in accordance with its intermediate dimension or width. This is accomplished by tilted rollers spaced a predetermined distance (in one example, six inches) above the last described belt, which rollers are rotated to grasp all mail having an intermediate dimension exceeding this value and forcibly lift and eject it from the conveyor belt.

The foregoing operations eliminate mail having dimensions greater than predetermined maxima. However, there remains the problem of small articles which are not adapted to be handled by automatic mail handling equipment and which may cause severe damage to such equipment. Typical of such articles are hotel keys which are often found in bulk mail.

Hotel keys and similar high-density articles are eliminated by allowing them to drop from a space between two successive conveyor belts while normal letter mail is fed across this gap by a pair of rollers on either side of the letter guide and rotated about vertical axes to grip letters along their upper edges to bridge them over the gap to the succeeding conveyor belt.

Apparatus for eliminating hotel keys and similar articles as described above is not claimed as the present invention but is rather covered in a separate concurrently filed application Serial No. 705,861 filed in the names of John C. Fisher, Morton Gale and Franklin J. Thurston, now abandoned.

The above apparatus is all arranged in such a fashion that a high degree of accuracy is attained in the sorting of mail and at the same time the possibility of damage to the mail is reduced to a negligible value. The details of one form of apparatus to accomplish the above operations will be described at length hereinafter. In addition to the features of the invention described above and those to be described hereinafter, there are certain particular objects of the invention.

It is one object of the present invention to provide an improved culling machine for sorting articles of various sizes and shapes to obtain articles falling within predetermined ranges of dimensions.

It is a further object of the present invention to provide improved mail culling apparatus for sorting letter mail and large flat envelopes from bulk mail.

It is still another object of the present invention to provide apparatus for culling from bulk mail all packages, newspapers, large flat envelopes, and the like which would tend to jam or damage letter mail processing equipment with improved speed and reliability.

It is still another object of the present invention to provide apparatus for culling mail wherein mail is oriented by a novel corrugated trough arrangement so that it may be sized according to a predetermined one of its dimensions.

It is still another object of the present invention to provide apparatus for culling mail wherein a novel conveyor belt arrangement is utilized to provide a funnel shaped moving aperture having a center belt dividing the aperture into two portions and moving at a different speed whereby packets of mail tending to cling together are stripped apart thus improving the efficiency and reliability of the culling operation.

Other objects and advantages will be apparent from a consideration of the following description in conjunction with the appended drawings, in which:

Fig. 1 is a side elevation of apparatus incorporating the present invention;

Fig. 2 is a top plan view of the apparatus of Fig. 1;

Fig. 6 is an enlarged fragmentary sectional view taken substantially along the line 6—6 in Figs. 1 and 2 and omitting all but one of the motors of Fig. 2 for the sake of clarity;

Fig. 7 is an enlarged fragmentary sectional view taken substantially along the line 7—7 in Fig. 2;

Fig. 8 is an enlarged end elevation taken along the line 8—8 in Figs. 1 and 2;

Fig. 9 is a fragmentary sectional view taken along the line 9—9 in Fig. 8;

Fig. 10 is an enlarged fragmentary sectional view taken along line 10—10 in Fig. 7;

Fig. 11 is a fragmentary side elevation of the roller mount of Fig. 10 as viewed from the right hand side;

Fig. 12 is an enlarged fragmentary sectional view taken substantially along the line 12—12 in Fig. 5;

Fig. 13 is a fragmentary sectional view taken substantially along the line 13—13 in Fig. 12;

Fig. 14 is an enlarged fragmentary sectional view taken substantially along the line 14—14 of Fig. 5 showing the planetary gear arrangement for driving one of the bulk separator belts, the belt and pulley being shown in phantom lines;

Fig. 15 is a view similar to Fig. 14 but showing a planetary gear arrangement for driving a different bulk separator belt at a different speed;

Fig. 16 is a schematic circuit diagram of the electrical controls for the various motors of the mail culling machine of Fig. 1.

Figure 3:
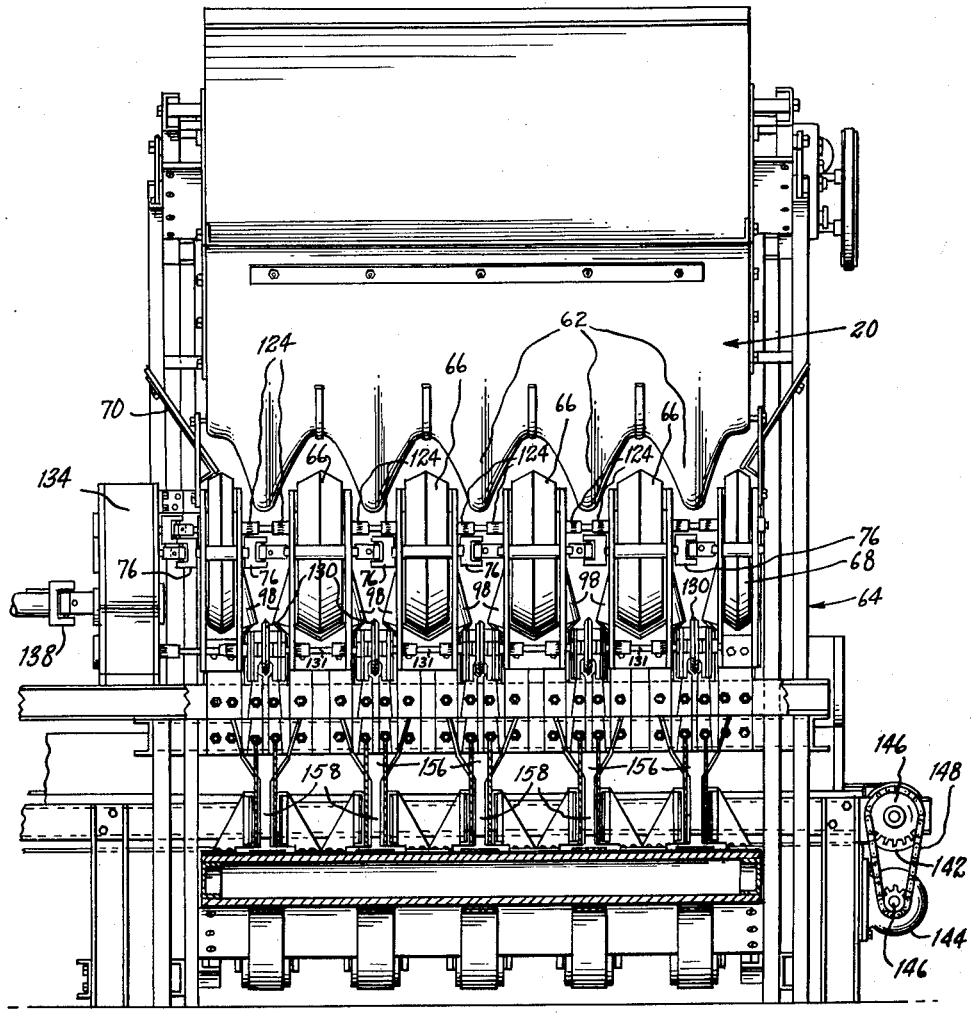
Fig. 3 is an enlarged fragmentary sectional view taken substantially along the line 3—3 in Fig. 1.

Referring now to the drawings and particularly to Figs. 1 and 2, a mail culling machine is shown having an input assembly 12 which is supported at the upper portion of the machine by an input assembly support 14.

The input assembly 12 includes an input belt assembly 16, a spreader belt assembly 18, an edger trough 20 and a hopper 22. The hopper 22 may be constructed of any desired size to accept bulk mail and may, if desired, be supplied by a mail chute, conveyor or other apparatus.

Input belt assembly

The input belt assembly 16 includes an input belt 24 and side rails 26 so that the bulk mail is transported from the hopper 22 upward along the belt 24.

The specific details of construction of the input belt 24 and other portions of the input belt assembly, with the exception of the edger trough 20, are not per se part of the present invention.

An incline idler roller 28 is provided so that the lower portion of the belt 24 has a greater incline than the upper portion of the belt. For example, the lower portion of the input belt 24 may be inclined at an angle of the order of 46° while the upper portion may be inclined at an angle of the order of 33°.

The belt 24 is preferably provided with a surface having a high coefficient of friction. The belt incline is arranged so that the coefficient of friction of the belt with respect to paper, letters, packages and the like, is sufficient to carry them up the belt without sliding. On the other hand, the incline at the lower portion of the belt is preferably sufficiently great so that the lesser coefficient of friction therebetween causes letters, packages and the like which are resting one on top of the other to tend to slide with respect to each other so that large piles of letters and/or packages are not carried intact up the input belt 24. It will thus be observed that the input belt 24 not only serves to transport the bulk mail from approximately floor level to the top of the mail culling equipment, but also tends to feed the mail piled in a hopper at a fairly uniform rate without allowing large piles to be placed in the machine at one time.

To further insure that the mail is fed into the machine at a moderately uniform rate a load control pan 40 is pivotally mounted at the upper end of the input assembly 12. The load control pan 40 is spring loaded to an upward position and is mechanically connected to a microswitch 42 as schematically indicated in Fig. 16.

Thus if a large pile of mail is carried up the input belt 24 and dumped on the load control pan 40, the microswitch 42 is opened. The microswitch 42 is connected in series with an electric clutch 27 which mechanically disconnects a motor 38 which drives the input belt 24 through input drive pulleys 36, input drive belts 34 and the driver belt roller 32. The other end of the input belt 24 is supported by a further belt roller 30.

When a large bunch of mail is carried up the input belt 24, as it falls on the load control pan 40, it closes microswitch 42, disengages clutch 27 and causes the belt 24 to stop, thus making it impossible for further pieces of mail to pile up at the top of the input belt 24 and insuring that the input of mail to the culling machine does not exceed a volume which it is capable of sorting. In due course the mail on the load control pan 40 will be carried away by the action of a succeeding belt which will later be explained so that the spring-loaded or counterweighted, if desired, load control pan 40 returns to its upper position opening the microswitch 42, engaging clutch 27 and once again starting the input belt 24.

It will be noted that the load control pan 40 has outwardly sloping surfaces 44 so that the mail being dumped on the load control pan tends to be spread out along the edge of the load control pan 40. The shape of the pan thus compensates for a tendency of the mail to concentrate at the center of the input belt 24, and also allows the input belt 24 to be narrower than succeeding sections of the mail culling apparatus.

*Spreader belt assembly*

The bulk mail is fed by gravity from the load control pan to a spreader belt 46 forming a part of the spreader belt assembly 18. As previously explained the spreader belt assembly 18 is not in itself a part of the present invention. The spreader belt 46 is provided with side rails 48 and is driven by a spreader belt drive roller 50. The spreader belt is supported at its right hand end by a further spreader belt roller 52.

The spreader belt is powered by a motor 58 which drives the spreader belt 48 through spreader belt drive belts 56 and spreader belt pulleys 54 as shown in Fig. 2.

The spreader belt is continuously driven, that is, it is not controlled by the load control pan 40. The spreader belt is preferably driven at a speed greater than that of the input belt 24 so that the bulk mail is spread out along the spreader belt due to the difference in speeds of the spreader belt 46 and of the input belt 24. As an example, the speed of the spreader belt may be of the order of 70 inches per second while that of the input belt may be of the order of 12 inches per second.

The bulk mail is carried to the right by the spreader belt 46 and falls from the end of the spreader belt 46 where it passes over the spreader belt roller 52. The tumbling of the mail from the end of the belt 46 tends to break up stacks of letters, and this action is facilitated by separator fingers 60 which extend into the path of mail falling from the end of the spreader belt 46. Stacks of letters thus tend to strike the separator fingers 60 and are tumbled and separated.

The operation of the fingers 60 is quite important as it will be obvious that letters and other mail carried along a conveyor belt will normally lie flat on the surface of the belt and will often fall in groups or clusters of overlapping letters. Such groups of letters would tend to cling together to form a large sheet and defeat the operation of the edger trough, to be described immediately below, unless they were broken up by the action of the fingers 60.

*Edger trough*

The bulk mail falling from the end of the spreader belt 48 falls into an edger trough 20, the shape of which is best shown in Fig. 3. The edger trough 20 and the finger 60 associated therewith and their combination with other apparatus described are important features of the present invention. The edger trough 20 is shown curved so that the mail which had been given a velocity toward the right in Fig. 1 is now reversed and is fed by gravity to the left in the edger trough 20. However, trough 20 could be straight and slanted down to the left so that mail drops on it from belt 48 and slides down to the left.

The edger trough 20 has a number of corrugations 62 so that mail falling into the trough is oriented with its minimum dimension in a horizontal plane. Thin mail such as letters, flat envelopes and the like are accordingly oriented by the edger trough so that the plane of the piece of mail is slanted downward and generally along the direction of movement of mail (longitudinally of the mail culling apparatus).

As seen in Fig. 3 the corrugations of the trough 20 extend below the top surface of bulk carrier belts 66 which perform the first step of the size sorting operation. Accordingly flat mail pieces guided in the corrugations 62 are dropped edge-wise between the belts 66, and any possibility of their coming to rest on the top of the belts 66 is avoided.

To attain the above advantage it is necessary for the spacing of the corrugations 62 to correspond to the spacing of the belts 66. The belts 66 are preferably spaced by an amount somewhat greater than six inches between belts. The width of the belts is not particularly critical but is preferably somewhat less than six inches.

The depth of the corrugations 62 is not particularly critical but should be on the order of the maximum width of articles to be sorted out by the culling machine. The depth of the corrugations in the present example may therefore be on the order of 12 inches. There is no particular advantage in providing corrugations of greater depth since larger flat articles need not be placed on edge and caused to fall through the bulk carrier belts. Rather it is preferable that very large flat objects be carried away by the bulk carrier belts thus reducing the load on the flat ejector mechanism which operates at a later stage in the sorting operation. While the corrugations are shown as increasing in depth in the direction of letter flow, that is not essential as they may be of uniform depth.

Although the tops of the corrugations 62 in Fig. 3 are all shown in the same height, these corrugations could, if desired, be made of alternately greater and lesser heights. Thus articles which bridge across the tops of but two adjacent corrugations 62 would, due to the different heights of the corrugations 62, tend to slide off the top of the corrugations and into the trough between corrugations 62.

A still further advantage of the edger-trough 20 is that it tends to separate the incoming mail into a number of streams (five in the present example) thus allowing a large volume of mail to be sorted without requiring an unduly high velocity of any one mail stream. Obviously if the mail which is sorted in the five streams in the illustrated apparatus were to be sorted in a single stream its velocity would necessarily be approximately five times as high. If this were mechanically possible it would at best greatly increase the risk of damage to the mail and the wear and tear on the apparatus.

*Bulk separator*

Figure 4:
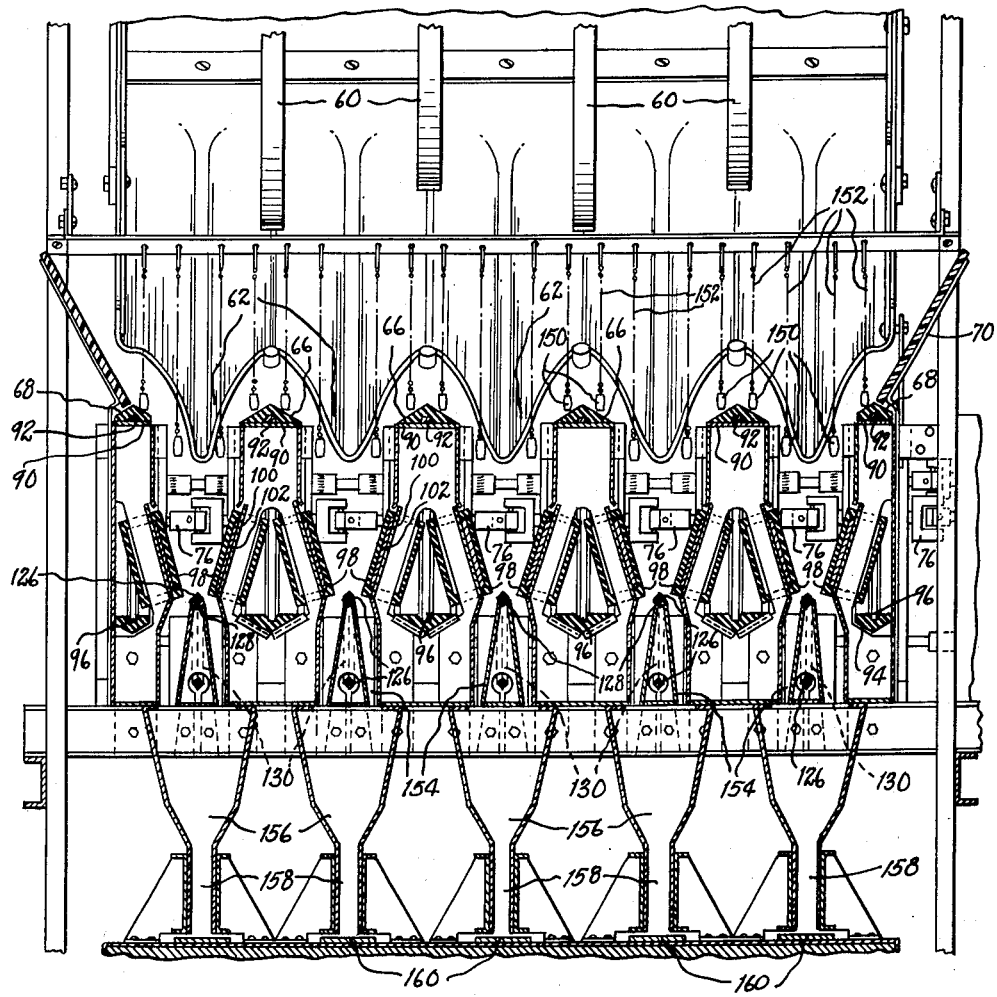
Fig. 4 is an enlarged fragmentary sectional view taken substantially along the line 4—4 in Fig. 1.
Figure 5:
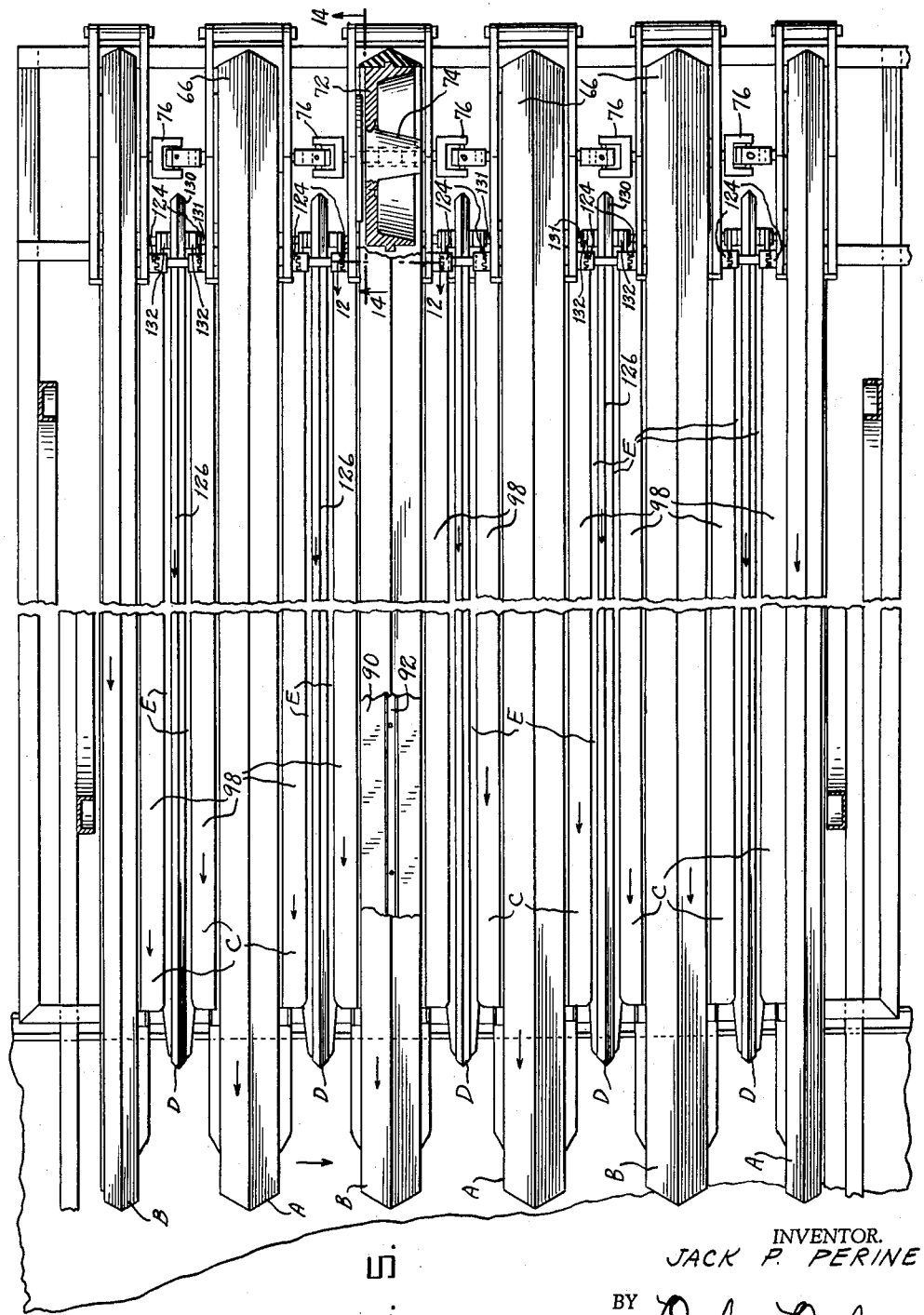
Fig. 5 is an enlarged fragmentary horizontal sectional view taken substantially along the line 5—5 in Fig. 1.

The bulk mail is fed from the edger trough 20 to the bulk separator assembly 64. The bulk separator assembly is best shown in Figs. 3 to 5. The bulk separator assembly performs the function of separating all mail having a thickness greater than a predetermined value from the remainder of the bulk mail; in the present example, the critical thickness is assumed to be of the order of ¼ of one inch. This thickness may thus be chosen to eliminate not only large packages but also rolled newspapers, large booklets and other objects while allowing letters of substantial thickness to pass through.

It is of utmost importance that the present apparatus perform this sorting operation without the necessity for close attention by operating personnel and that it be virtually impossible for mail of any kind to jam in the machine.

It should be appreciated that the apparatus is designed to process mail at the rate of tens of thousands of pieces per hour and it may thus readily be seen that if mail were to jam in the machine, serious damage to the machinery would be likely to result to say nothing of the certain damage to the mail pieces.

The present invention provides a novel sorting mechanism which is virtually impossible to jam and thus requires a minimum of attention. This substantially foolproof operation of the machine is provided by the fact that the letter mail is separated from the parcels, newspapers and the like by falling through moving apertures formed by a series of moving belts arranged in a fashion that will now be explained.

At the top of the bulk separator assembly 64 there are a number of bulk carrier belts 66. At the edges of the bulk separator assembly are further bulk carrier belts 68 which are somewhat narrower than the center belts 66. Along the sides of the bulk separator there are side rails 70 which prevent packages or other mail from falling off at the side of the bulk separator.

The bulk carrier belts 66 are driven by bulk carrier drive pulleys 72 as shown in the cut-away portion of Fig. 5. The bulk carrier belt pulleys 72 are rotatably mounted on bulk carrier belt shafts 74 which are connected by flexible couplings 76.

The pulleys 72 are not directly driven by the shafts 74 as it is desired that alternate ones of the bulk carrier belts 66 shall be driven at different speeds for reasons which will later be explained. The shafts 74 being coupled by flexible couplings 76 all rotate at the same speed so that in order to provide different velocities for alternate ones of the bulk carrier belts 66, a planetary gear train 78 or 78a is provided for each of the bulk carrier belts 66 and for the edge bulk carrier belts 68. These planetary gear train arrangements are shown in Figs. 14 and 15.

Referring to Fig. 15 a bulk carrier belt 66 and a bulk carrier belt drive pulley 72 are shown in phantom lines. A ring gear 80 is mounted on a bracket 82 which is stationary with respect to the frame of the bulk separator assembly 64. A center gear 84 is mounted to rotate with the shaft 74. Planetary gears 86 are rotatably mounted on planetary gear shafts 88 forming a part of the pulley 72. The pulley 72 is thus driven by the shaft 74 at a reduced speed which is determined by the numbers of teeth on gears 80, 84 and 86. It is therefore possible by providing gears with different numbers of teeth for the various ones of the pulleys 72 to cause the speed of alternate ones of the pulleys 72 to be different and thus to attain the desired difference in speed between alternate ones of the bulk carrier belts.

The manner in which this may be done is shown illustratively in Fig. 14, where it will be noted that the large and small gears of Fig. 15 are reversed. In Fig. 14 the center gear 84a is smaller than the planetary gears 86a. The ring gear 80a may be of the same size and the planetary gear train 78a of Fig. 14 provides a different ratio between the speed of rotation of the shaft 74 and the speed of rotation of the pulley 72 than that provided by the planetary gear arrangement 78 in Fig. 15.

A particularly advantageous feature of the present invention resides in the fact that the above-described arrangement causes alternate ones of the bulk carrier belts 66 and 68 to travel at different speeds. This different speed of travel causes pieces of mail which fall on and rest upon two or more of the carrier belts 66 to be turned about a vertical axis as they travel along the bulk carrier belts (from right to left in Fig. 5). The turning of the mail pieces causes them to tend to drop between bulk carrier belts if they have any dimension which is small enough to allow them to drop between these belts. A long narrow envelope or package which falls on two or more of the bulk carrier belts with its long dimension bridging the belts will therefore be rotated by the difference in speed of adjacent belts so that its longer dimension is turned in a longitudinal direction thus causing the long narrow article to fall between the belts where it may be sorted into the letter mail channel if its minimum dimension is less than ¼ of an inch. Suitable belt velocities for the bulk carrier belts 66 are of the order of 31 inches per second and 42 inches per second, it being understood that the two different speeds are assigned to adjacent ones of the belts.

In order to obtain the maximum advantage from the different belt speeds for the bulk carrier belts 66 it is preferred that the spacing between belts be approximately the prescribed maximum width of mail to be selected by the sorter. With this arrangement long narrow envelopes or other articles which fall across two of the bulk carrier belts are rotated so that they cannot possibly be carried off by the bulk carrier belts if they have a width within the prescribed limits for the sorter. As an example, business envelopes approximately four inches by ten inches which by chance bridge across adjacent bulk carrier belts are turned by the different speeds of the belts. The four inch dimension is less than the spacing between the belts, thus causing the envelops to fall between the bulk carrier belts 66 as desired.

The operation of the bulk carrier belts therefore provides an exceptionally high degree of reliability in the sorting operation so that few if any of letter mail pieces will be carried away by the bulk carrier belts 66 to be mixed with the package and parcel mail.

The bulk carrier belts shown by way of illustration are of generally triangular cross-section so that an envelope or other piece of letter mail which may happen to fall flat side down on one of the belts would ordinarily not remain on the belt but would slide down the sloped upper surface of the belt to fall between adjacent bulk carrier belts. The bulk carrier belts 66 are supported by a belt support 90 as shown in a cut-away portion of Fig. 5. Thus the bulk carrier belts' upper surfaces are firmly supported and are capable of carrying quite heavy articles without being twisted or forced to one side.

The belt support 90 is provided with a belt guide 92 which engages a channel 67 (shown in Fig. 12) in the inside surface of the bulk carrier belt thus retaining it on the belt support 90.

It should be appreciated that the particular shape of the bulk carrier belt shown by way of illustration is only one of many shapes which may be utilized. For example, the bulk carrier belt may be made flat and the belt support 90 may have a semi-circular or curved cross-section so that the top surface of the belt is bent to an arcuate shape in passing over the guide. An arcuate convex upper surface will tend to prevent small envelopes resting on the top of the belt as does the triangular shape illustrated.

The bulk separator assembly is also provided with a bulk carrier belt return support 94 and a bulk carrier belt return guide 96 for guiding the belts 66 in their lower or return spans between drive pulleys 72 and driven pulleys 97.

Between each adjacent pair of bulk carrier belts 66 or 68 is located a pair of side aperture belts 98 as may be seen in Figs. 4 and 5. These side aperture belts 98 are sloped inward at their lower edges to form a constriction which narrows the aperture between adjacent bulk carrier belts (which may be on the order of six inches) to an aperture which is slightly more than one-quarter inch wide.

The side aperture belts 98 are preferably flat belts which are supported by side aperture belt supports 100 in the form of a shallow channel which may be formed of sheet metal, for example. The side aperture belts 98 are thus supported with a predetermined separation which will not vary even though relatively heavy parcels or packages come to rest on these belts. The side aperture belts 98 are held in place on the supports 100 by a side aperture belt guide 102 which extends longitudinally along the aperture belt support and is engaged by ribs 104 extending along edges of the side aperture belts 98 and which may best be observed in Fig. 12.

In Fig. 12 there is also shown the drive mechanism for the side aperture belts 98. At each end of each side aperture belt the belt encircles a side aperture belt roller 106. At the right end of the belts (as shown in Fig. 5) the rollers 106 are drive rollers while at the opposite end the rollers are freely rotating or driven rollers. The drive rollers 106 are shown in Fig. 12 and are mounted on a shaft 108 to which they are secured as by set screws 110 so that the rollers 106 rotate with the shafts 108. The shafts 108 are mounted in bearings 112. Helical gears 114 are mounted to rotate with the shafts 108.

The helical gears 114 are driven through intermediate gears 116 by drive gears 118 which are mounted to rotate with side aperture belt drive shafts 120. The shafts 120 are mounted in bearings 122, and the shafts for respective pairs of side aperture belts are coupled together by flexible couplings 124. The flexible couplings 124, like the flexible couplings 76, are provided in accordance with the usual mechanical engineering practice to ensure free rotation of the various shafts and to avoid binding of these shafts in their bearings.

It will be observed that the side aperture belts are arranged to provide a moving aperture having a funnel-like opening so that objects which are small enough to fall between the bulk carrier belt 66 but large enough to bridge the distance between respective pairs of side aperture belts 98 will be carried to the left in Figs. 1 and 5. These side aperture belts preferably are driven at a speed somewhat greater than that of the bulk carrier belts. A suitable speed for example is of the order of 52 inches per second. The relatively high speed of these belts allows the bulk separator to be rapidly cleared of bulky materials and also in cooperation with a still further belt tends to strip apart groups or packets of letters as will later be explained.

The portion of the bulk separator assembly thus far described represents apparatus which in itself is not a part of the present invention. The present invention however includes the improvement provided by further center aperture belts described immediately below and combinations thereof with the apparatus heretofore described.

Between and below each pair of side aperture belts 98 there is provided a center aperture belt 126. This belt runs in a center aperture belt guide 128, and at each end of the belt, pulleys 130 are provided. As in the case of the other belts, the pulleys at the right hand end in Fig. 5 are the drive pulleys for the center aperture belts. The center aperture belts 126 preferably have a cross-section in the form of a rhombus or diamond. The center aperture belt guides 128 accordingly may be formed in V-shape. The center aperture belt pulleys 130 may be secured on shafts 131 for rotation therewith. The shafts 131 are interconnected by flexible couplings 132 similar to previously described couplings 124. The shafts 131, 74 and 120 for driving the respective belts of the bulk separator assembly are all driven from a gear box 134 which is in turn driven by a bulk separator motor 136 through a flexible coupling 138.

The speed of the center aperture belt 126 is preferably substantially less than that of the side aperture belts. For example, the center aperture belt 126 may be driven at a speed of the order of eleven inches per second. This substantial difference in speed causes loose packets of letters which have not previously been broken up by the operation of the culling machine, to be stripped apart due to this difference in speed.

It will be noted that a packet of letters which is thicker than ¼ of an inch and thus cannot pass between the side aperture belt 98 and the center aperture belt will come to rest with an edge of the packet resting on the center aperture belt 126. The face of one of the outside letters of the packet will rest against one of the side aperture belts 98. Thus the packet of letters will tend to move at the speed of the center aperture belt, illustratively, eleven inches per second, but the outside letters of the packet will be stripped off at the speed of the side aperture belt 98, illustratively 52 inches per second. As the outside envelope of a packet is stripped off, the succeeding envelope will come in contact with the side aperture belt 98 and will be stripped away from the packet.

This process will continue until the packet has been stripped down completely or to a size where it will fall through the space between the side aperture belt 98 and the center aperture belt 126 forming the final moving aperture of the bulk separator assembly. Obviously as the letters are stripped away from the packet they also will individually fall between the side aperture belt 98 and the center aperture belt 126 (provided they are less than ¼ inch thick).

The above stripping action of the side aperture belts 98 and center aperture belts 126 also greatly contributes to the reliability of the sorting operation. It will be appreciated that two or more letters whose combined thickness is greater than ¼ of an inch will often fall between the side aperture belts 98 in such a fashion that they are stacked together or overlapped and thus in combination are too large to fall through the aperture at the lower edges of these belts. If it were not for the differential in speed between the side aperture belts 98 and the center-aperture belts 126 all such letters would be carried away to be mixed with the package and parcel mail and would become erroneously sorted mail pieces which would have to be recovered by later hand sorting.

With the arrangement provided, however, the possibility of erroneous sorting from this cause is virtually eliminated and the sorting operation is thus rendered highly reliable.

The articles which have a thickness of greater than ¼ of an inch and are accordingly too large to fall between the side aperture belts 98 and the center aperture belts 126 are transported to the left in Fig. 1 by either the bulk carrier belts 66, the side aperture belts 98, or the center aperture belts 126, where they fall onto the bulk separator reject belt 140. The reject belt 140 runs on reject belt rollers 142 as shown in Fig. 3 and is driven by a reject belt motor 144 through a chain 148 and sprockets 146. The parcels, newspapers, etc., which are rejected from the bulk separator at the bulk separator reject belt 140 may be transported by automatic conveyors or otherwise to various stations where this type of mail may be processed.

The portion of the apparatus described hereinafter although a part of the overall combination is not alone a feature of the present invention, but forms in part the subject of the separate concurrently filed application Serial No. 706,118 and in part that of application Serial No. 705,861 entitled, Mail Culling Equipment in the names of Franklin J. Thurston, John C. Fisher and Morton Gale.

In the operation of the bulk separator as described thus far bulk mail is fed to the bulk separator on edge from the edger trough 20. If the operation of the edger trough is absolutely perfect, all the letter mail will fall edgewise between the bulk carrier belts 66. However, in rare instances, letter mail may balance on the top of the bulk carrier belt 66 in which case it would be carried along the belt until it was dropped on the bulk separator reject belt 140. This occasional error in sorting may be remedied by suspending weights 150 from wires or cords 152 so that letters or other small articles which happen to balance on the top of the bulk carrier belt 66 are dislodged by these suspended weights 150.

Suspended weights 150 are sufficiently light that they will not interfere with the passage of larger and heavier packages along the top of the bulk carrier belt 66. The weights 150 are an optional feature which may be dispensed with without greatly affecting the efficiency of the sorting process.

The operation of the bulk separator wherein mail having a thickness of less than ¼ of an inch is separated from the remainder of the bulk mail has been described. This mail which is not rejected by the bulk separator will normally consist of letters (including post cards) large flat envelopes, and perhaps other extraneous matter such as hotel keys and the like.

This mail passes out of the bulk separator through channels 154, funnels 156, and into letter mail guides 158, all shown in Fig. 4. At the bottom of the mail guides 158 there are respective letter mail conveyor belts 160. These belts run over tensioning rollers 162 shown in dotted lines in Fig. 1 and over a drive roller 164 shown in Figs. 6 and 7. The drive roller 164 is driven by a motor 166 through a chain 168 and sprockets 170. The letter mail conveyor belts 160 travel in the direction opposite to that of the belts of the bulk separator, that is, the letter mail conveyor belt travels to the right in Figs. 1, 2 and 7. The speed of the letter mail conveyor belt 160 is not particularly critical but may be of the order of 60 inches per second.

It should be noted that a distinct advantage is provided by the fact that the letter mail conveyor belt 160 travels in the opposite direction to the previous bulk separator belts. Due to this fact the mail which falls into the guides 158 to rest on the conveyor belt 160 is caused to reverse in direction so that if it falls on its narrow end it is tumbled by the action of the letter mail conveyor belt 160 so that the mail on the conveyor belt 160 in the guides 158 is generally oriented so that it is resting on its longest edge.

The belts 160 are kept tight by tensioning rollers 162 shown in dotted line in Fig. 1. The tensioning rollers 162 are rotatably mounted on arms 172. The arms 172 are pivotally mounted about a shaft 174 as shown in Fig. 1 and are urged by means of springs 176 in a clockwise direction in Fig. 1. The rollers 162 are thus urged to the left in Fig. 1 thereby maintaining the tension of the mail conveyor belts 160.

Large envelope ejector

From the bulk separator assembly the bulk mail which has had all parcels, newspapers and the like ejected is then passed to the section of the mail culling apparatus which ejects large flat envelopes. In mail handling operations these large flat envelopes are referred to as "flats" and will hereinafter be referred to as such.

The flat ejector section of the mail culling apparatus is best shown in Figs. 6 and 7. The end portions 178 of the letter mail guides 158 are cut away. Flat ejector rollers 180 and 182 are rotatably mounted on an oblique axis so that letter mail having a height greater than a predetermined limit is caused to roll between the flat ejector rollers 180 and 182. Mail of a lesser height than this predetermined limit (which in this example is six inches) passes under the rollers 180 and 182 without being affected thereby.

The roller 180 of each pair of rollers is the drive roller while the roller 182 is the driven roller, that is, it is freely rotatable and is caused to rotate by the frictional action of the drive roller 180. The rollers are mounted on respective brackets 184 and are driven by flat ejector motors 186 through flat ejector drive belts 188. The peripheral speed of these rollers may be of the order of 180 inches per second, and is preferably sufficiently high so that envelopes engaging the rollers are sharply accelerated upward and forward so that they are projected to strike a flat-ejector screen 190 and fall on a flat ejector belt 192.

The flat ejector belt and its drive mechanism may be seen in Fig. 8. In Fig. 8 the flat ejector belt passes over rollers 194, the left end roller being driven by flat output belt motor 196 through a chain 198 and sprockets 200. An idler roller 202 is provided to direct the belt return upward to conserve space in the mechanism.

As in the case of the other output belts of the mail culling apparatus, the flat output belt may communicate with further conveying means to transport large flat envelopes or flats to various stations where they are processed further.

Key ejector

It will be noted in Fig. 7, for example, that the end roller 164 of the letter mail conveyor belt 160 is located slightly to the right of the flat ejector rollers 180 and 182. Small objects such as hotel keys and the like thus drop off of the end of the letter mail conveyor belt 160 where they may be collected in a box as shown at 203 (in Fig. 7). If desired the box 203 may be replaced by a conveyor output belt.

Clean letter mail is prevented from dropping off the end of the letter mail conveyor belt 160 by letter mail rollers 204 and 206 which are located in pairs on either side of each letter mail guide 158 at a position slightly to the right of the flat ejector rollers 180 and 182. The letter mail rollers 204 are rotatably mounted about a vertical axis on brackets 208 and are freely rotatable. The rollers 206 are drive rollers and are driven by the flat ejector motors 186. Only one flat ejector motor 186 is shown in Figs. 6 and 7 in order to clearly show the other mechanism associated with the rollers.

The letter mail rollers 204 and 206 are set at a predetermined height above the letter mail conveyor belt 160 so that any envelope of greater height is engaged by the letter mail rollers 204 and 206 and is prevented from falling off of the end of the letter mail conveyor belt 160. The letter mail rollers 204 and 206 may be driven at the same speed as the flat ejector rollers 180 and 182.

The letter mail rollers 204 are resiliently mounted so that they will readily accommodate any mail up to ¼ inch in thickness without causing any damage to the mail. The resilient mounting for the letter mail rollers 204 is shown in Figs. 10 and 11. Arms 210 extend from each bracket 208 to support a roller 204. These arms are provided with respective slots 212 and rollers 204 are rotatably mounted on shafts 214, the ends of which are located in the slots 212. A spring 216 is mounted in each of the slots 212 and is provided with a cap 218 which bears against the shaft 214. The shafts 214 and the rollers 204 mounted thereon are therefore mounted slidably along the length of the arms 210.

The spring 216 or the spring cap 218 are retained in place by a guide rod 220 which passes through a hole in the shaft 214. It will thus be seen that the rollers 204 are mounted so that they are normally urged toward the drive rollers 206 but are resiliently supported in such a manner that they will readily accommodate letter mail of any width up to ¼ of an inch without causing damage to the mail even though it be passed through the rollers at a high rate of speed.

Letter mail from the letter mail rollers 204 and 206 is fed to clean letter mail output belts 222. The letter mail is transported along the belts 222 and is maintained vertically oriented by output letter mail guides 224. The letter mail output belts 222 run on drive rollers 226 and tensioning rollers 228 (shown in Figs. 8 and 9). The drive rollers 226 are driven by a letter mail output motor 230 through a chain 232 and sprockets 234. The tension in the letter main output belts 222 is maintained by the tensioning rollers 228 which are rotatably mounted on pivot arms 236 which are in turn pivotally mounted on a shaft 238 as shown in Fig. 9. The arms 236 are urged in a clockwise direction in Fig. 9 by a spring 240, thus causing each of the output belts 222 to be maintained in tension.

Electrical control circuit

The electrical control circuit for the various motors previously described is shown schematically in Fig. 16. A control panel is shown at 242 which contains respective start and stop buttons 244 for the bulk separator assembly, the input assembly, the flat ejector section and the other various conveyor belts. The start and stop buttons 244 operate switches which are connected by wire pairs 246, 248, 250 and 252 to various circuit-breaker panels.

The start and stop buttons 244 controlling the bulk separator assembly are connected by means of wire leads 246 to a starter and circuit breaker panel 254 which is in turn connected by four-wire leads 256 to a two phase power line. The panel 254 controls the starting and stopping of the two-phase bulk separator motor 136 in response to the operation of the bulk separator start and stop buttons. The starter and circuit breaker panel 254 is conventional and controls the starting current to the motor 136 and causes the power supply to the motor 136 to be cut off should an overload occur. The motor 136 is mechanically connected to gear box 134 which in turn drives belts 66, 126 and 98 of the bulk separator.

The start and stop buttons 234 which control the output and other conveyor belts operate a switch which is connected through wire pair 248 to circuit breaker panel 258. Circuit breaker panel 258 is connected to a single phase power supply and serves to connect motors 196, 166, 230 and 144 to the single phase power line. Circuit-breaker panel 258 and the other circuit-breaker panels described hereinbelow protect their respective motors from overload in the conventional manner. The motors 196, 166, 230 and 144 drive belts 192, 160, 222 and 140 as previously explained.

The buttons 244 which control the flat ejector section operate a switch which is connected through a wire pair 250 to a circuit breaker panel 262. The circuit breaker panel 262 is connected through the wire pair 264 to the single phase power line and serves to connect this power line to flat ejector motors 186 in a conventional manner. The motors 186 drive the rollers 180 as previously explained.

The start-stop buttons 244 for the input assembly of the mail culling apparatus are connected by wire pair 252 to a circuit breaker panel 266 which is connected by a wire pair 268 to the single phase power line and serves to furnish single phase power to motors 58 and 38. Motor 58 drives the spreader belt 46. The motor 38 is connected through an electric clutch 27 to drive input belt 24. Electric clutch 27 is controlled by a microswitch 42 operated by the load control pan 40. Thus the belt 24 is started by the input start button and continues to operate until the load control pan is overloaded, at which time the circuit through the microswitch 42 is closed disengaging the electric clutch 27 and causing the belt 24 to stop.

While the foregoing form of the invention has been illustrated with a center aperture belt 126 moving at constant speed, similar results may be obtained by oscillatory or vibratory movement of the belt 126. As a similar structure, the belt may then be replaced by a rigid tongue which may be oscillated or vibrated in a forward and backward direction to give the desired shearing action on letter packets. As a further alternative this tongue may be moved in an orbital manner to perform both vertical and horizontal oscillatory movement while remaining in a horizontal attitude. In such case the tongue may have a substantial vertical side dimension to maintain uniformity of gap.

From the foregoing explanation it will be seen that an improved mail culling apparatus is provided which accepts bulk mail, that is, material containing packages, newspapers, hotel keys and other matter in addition to letter mail and that this bulk mail is processed by the apparatus to furnish separate outputs of packages and rolled newspapers, large flat envelopes, keys and other small objects, and letter mail having prescribed maximum length, width and thickness. A particular apparatus has been described for accomplishing this purpose containing conveyor belts of particular velocity, or shape and in prescribed numbers for accomplishing the purpose of the invention. However, it will be appreciated that these details and other aspects of the preferred embodiment described may readily be modified by a person of ordinary skill in the art without exceeding the scope of the invention. Accordingly the scope of the invention is not to be construed as limited to the particular embodiment shown, but is rather to be limited solely by the appended claim.

What is claimed is:

Apparatus for sorting by size pieces of mail or the like, said apparatus comprising an input conveyor belt having an upward direction of movement at a substantial angle with the horizontal, a pivotally mounted pan at the upper end of said input belt located to receive the articles passing off the end of said belt, means urging said pan in an upward direction with a predetermined force, means including a switch sensitive to the downward displacement of said pan for controlling the movement of said input conveyor belt, a spreader belt located under said pan to receive articles sliding therefrom, means for driving said spreader belt, an arcuate trough having corrugations around the periphery thereof, said corrugations having a depth on the order of the maximum dimension of articles which are to be sorted from a mass of articles supplied to said apparatus, said trough being placed to receive articles from the end of said spreader conveyor belt and sloping downward to allow said articles to slide by gravity along said trough in the direction of said corrugations therein, prongs extending into the path of articles passing off the end of said spreader conveyor belt thereby causing groups of articles adhering together to strike said prongs and tending to break apart said groups of articles prior to their falling into said trough, a set of narrow substantially horizontal bulk conveyor belts arrayed in spaced parallel configuration and located to receive articles passing off the top edges of the corrugations of said trough, means for driving adjacent ones of the belts of said set of bulk conveyor belts at different speeds, at least one further pair of conveyor belts of substantial width, each belt of said pair being located below a respective one of two adjacent bulk conveyor belts, said pair of conveyor belts having their lower edges spaced by a predetermined distance and their upper edges spaced by a greater amount to form an elongated funnel-like aperture with movable walls, means for causing the surface of each of said belts forming said side walls to move in a predetermined direction, an intermediate conveyor belt located between the narrow spaced edges of said pair of conveyor belts thereby causing the aperture formed by the lower edges of said pair of belts to be divided into two smaller apertures by said intermediate belt, means for causing the surface of said intermediate belt to move at a substantially different speed from that of said pair of belts, a further conveyor belt placed below said pair of conveyor belts, means for moving the upper surface of said further conveyor belt in a horizontal direction opposite to the horizontal component of velocity of articles falling through said pair of belts, a guide placed above said further conveyor belt for maintaining articles on said belt in a predetermined orientation, at least one pair of rollers located on respective sides of said guide spaced above the surface of the last said belt and having axes inclined from the horizontal, and means for rotating said one pair of rollers, to thereby eject articles from the last said belt of a size sufficient to contact said rollers.

References Cited in the file of this patent
UNITED STATES PATENTS

| | | |
|---|---|---|
| 924,332 | Fleming | June 8, 1909 |
| 1,533,180 | Goldberg | Apr. 14, 1925 |
| 1,552,366 | Wade | Sept. 1, 1925 |
| 1,835,507 | Lipps | Dec. 8, 1931 |
| 1,888,709 | Whisnand et al. | Nov. 22, 1932 |
| 1,918,398 | Johnson | July 18, 1933 |
| 1,984,672 | DeBack | Dec. 18, 1934 |
| 2,059,038 | Sala | Oct. 27, 1936 |
| 2,292,068 | Grayson | Aug. 4, 1942 |
| 2,818,160 | Lamouria | Dec. 31, 1957 |
| 2,843,263 | Henry | July 15, 1958 |